(12) United States Patent
Wu

(10) Patent No.: US 11,971,125 B2
(45) Date of Patent: Apr. 30, 2024

(54) INFLATION PUMP CONNECTOR SUITABLE FOR VARIOUS VALVES

(71) Applicant: Scott Wu, Taichung (TW)

(72) Inventor: Scott Wu, Taichung (TW)

(*) Notice: Subject to any disclaimer, the term of this patent is extended or adjusted under 35 U.S.C. 154(b) by 57 days.

(21) Appl. No.: 17/940,147

(22) Filed: Sep. 8, 2022

(65) Prior Publication Data
US 2023/0160511 A1 May 25, 2023

(30) Foreign Application Priority Data
Nov. 25, 2021 (TW) .................... 110144043

(51) Int. Cl.
| | |
|---|---|
| *B60C 29/00* | (2006.01) |
| *B60C 29/06* | (2006.01) |
| *F16L 37/05* | (2006.01) |
| *F16L 37/133* | (2006.01) |
| *F04B 33/00* | (2006.01) |
| *F16K 15/20* | (2006.01) |

(52) U.S. Cl.
CPC ............ *F16L 37/133* (2013.01); *B60C 29/00* (2013.01); *B60C 29/06* (2013.01); *F16L 37/05* (2013.01); *F04B 33/005* (2013.01); *F16K 15/20* (2013.01); *Y10T 137/3584* (2015.04)

(58) Field of Classification Search
CPC .......... B60C 29/00; B60C 29/06; F16L 37/05; F04B 33/005; F16K 15/20; Y10T 137/3584
See application file for complete search history.

(56) References Cited

U.S. PATENT DOCUMENTS

| | | | | |
|---|---|---|---|---|
| 1,617,299 | A * | 2/1927 | Benton | ................... B60C 29/06 138/89.4 |
| 4,664,153 | A * | 5/1987 | Bishop | .................. F16L 37/133 137/231 |
| 5,012,954 | A * | 5/1991 | Will | ........................ B60C 23/10 141/330 |
| 5,443,370 | A * | 8/1995 | Wang | .................. F04B 39/0016 417/547 |
| 6,076,544 | A | 6/2000 | Pierce | |

(Continued)

FOREIGN PATENT DOCUMENTS

| | | |
|---|---|---|
| TW | I560384 B | 12/2016 |
| TW | M603492 U | 11/2020 |

*Primary Examiner* — Craig M Schneider
*Assistant Examiner* — Christopher D Ballman
(74) *Attorney, Agent, or Firm* — Muncy, Geissler, Olds & Lowe, P.C.

(57) ABSTRACT

An inflation pump connector includes a housing a sliding groove extending along a longitudinal axis and a pressing device slidably received in the sliding groove. The pressing device includes an airtight ring and a clamping member. The clamping member includes a base and a first claw. The first claw includes a first clamping arm, a first pressing portion, a second clamping arm, and a first hollow portion. The first clamping arm is connected to the base. The first pressing portion is connected to an end of the first clamping arm opposite to the base. The second clamping aim is connected to the first pressing portion. The first hollow portion is disposed between the first clamping arm and the second clamping arm. The first pressing portion is movable towards the longitudinal axis and to squeeze and deform the airtight ring.

10 Claims, 8 Drawing Sheets

(56) References Cited

U.S. PATENT DOCUMENTS

| | | | |
|---|---|---|---|
| 6,102,063 A | 8/2000 | Pierce et al. | |
| 7,866,335 B2* | 1/2011 | Wang | F04B 33/005 |
| | | | 137/231 |
| 8,297,658 B2* | 10/2012 | Le Quere | F16L 37/1215 |
| | | | 285/308 |
| 8,353,736 B2* | 1/2013 | Wang | F04B 33/005 |
| | | | 102/530 |
| 8,402,987 B2* | 3/2013 | Wang | B60S 5/043 |
| | | | 251/149.1 |
| 8,720,475 B2* | 5/2014 | Wu | F04B 33/005 |
| | | | 137/271 |
| 8,839,809 B1* | 9/2014 | Wang | F04B 33/005 |
| | | | 137/231 |
| 9,249,914 B2* | 2/2016 | Kuo | F16L 37/1215 |
| 9,409,475 B2* | 8/2016 | Ignaczak | F16L 37/05 |
| 9,675,981 B2* | 6/2017 | Wang | B60S 5/04 |
| 9,759,337 B2* | 9/2017 | Cassiman | F16K 15/20 |
| 10,137,746 B2* | 11/2018 | Tiziani | B60C 23/001 |
| 10,203,059 B2* | 2/2019 | Chuang | F16K 15/20 |
| 10,208,865 B2* | 2/2019 | Wang | F16K 15/20 |
| 10,690,279 B2* | 6/2020 | McIntyre | B60C 29/06 |
| 10,792,963 B2* | 10/2020 | Shen | B60C 29/06 |
| 2014/0210203 A1* | 7/2014 | Lorkowsi | F16L 37/127 |
| | | | 285/88 |
| 2015/0053280 A1* | 2/2015 | Wang | F16K 3/267 |
| | | | 137/231 |
| 2015/0330525 A1* | 11/2015 | Wang | F16K 15/20 |
| | | | 137/231 |
| 2016/0076662 A1* | 3/2016 | Wang | F16K 15/20 |
| | | | 137/231 |
| 2017/0009922 A1* | 1/2017 | Hsu | F16K 35/022 |
| 2018/0172167 A1* | 6/2018 | Kuo | F16K 15/20 |

\* cited by examiner

INFLATION PUMP CONNECTOR SUITABLE FOR VARIOUS VALVES

BACKGROUND OF THE INVENTION

The present invention relates to an inflation pump connector and, more particularly, to an inflation pump connector suitable for various valves.

Taiwan Utility Model No. M603492 discloses an inflation pump connector suitable for various valves. The inflation pump connector includes a housing and a pressing device. The housing includes a sleeve having a sliding groove extending along a longitudinal axis. The sleeve includes a front end and a rear end opposite to and spaced from the front end along the longitudinal axis. The pressing device is received in the sliding groove and is slidable between a first position and a second position. The pressing device includes a push seat and an airtight ring. The push seat is adjacent to the rear end, and the airtight ring is adjacent to the front end. The pressing device is provided with a plurality of claws each extending in a direction parallel to the longitudinal axis. The claws are disposed on an outer periphery of the airtight ring around the longitudinal axis. When the pressing device is in the second position, the claws squeeze and deform the airtight ring.

When the above inflation pump connector is coupled with an American valve or a French valve, tight clamping by the claws is required. However, the diameter of the American valve is different from that of the French valve. In a case that the claws can tightly clamp the American valve, suitable deformation may not be generated when the claws clamp the French valve, leading to an unsatisfactory airtight effect.

In view of the shortcoming of the above conventional structure, the present inventor has designed an inflation pump connector suitable for various valves to overcome the drawbacks of the conventional structure.

BRIEF SUMMARY OF THE INVENTION

The primary objective of the present invention is to provide an inflation pump connector suitable for various valves. The inflation pump connector includes a housing and a pressing device. The housing includes a front end and a rear end spaced from the front end along a longitudinal axis. The housing includes a sliding groove extending along the longitudinal axis. The sliding groove extends from the rear end towards the rear end. The pressing device is slidably received in the sliding groove and is switchable between a first state and a second state. The pressing device includes an airtight ring and a clamping member. The clamping member includes a base and a first claw contacting with the airtight ring. The first claw includes a first clamping arm, a first pressing portion, a second clamping arm, and a first hollow portion. An end of the first clamping arm is connected to the base. The first pressing portion is connected to another end of the first clamping arm opposite to the base. An end of the second clamping arm is connected to the first pressing portion. Another end of the second clamping arm extends towards the base. The first hollow portion is disposed between the first clamping arm and the second clamping aim. The second clamping arm is off contact with the first clamping arm or the base. The clamping member includes at least one second claw contacting with the airtight ring. The at least one second claw includes a fourth clamping arm, a second pressing portion, a fifth clamping arm, and a third hollow portion. An end of the fourth clamping arm is connected to the base. The second pressing portion is connected to another end of the fourth clamping arm opposite to the base. An end the fifth clamping arm is connected to the second pressing portion. Another end of the fifth clamping arm extends towards the base. The third hollow portion is disposed between the fourth clamping arm and the fifth clamping arm. The fifth clamping arm is off contact with the fourth clamping arm or the base. The pressing device is movable away from the rear end of the housing to move the first pressing portion and the second pressing portion away from the longitudinal axis, switching the pressing device to the first state. The pressing device is movable towards the rear end of the housing to actuate the first pressing portion and the second pressing portion to move towards the longitudinal axis and to squeeze and deform the airtight ring, switching the pressing device to the second state.

In an example, the first claw includes a third clamping arm and a second hollow portion. An end of the third clamping arm is connected to the first pressing portion. Another end of the third clamping arm extends towards the base. The second and third clamping arms are located on two opposite sides of the first clamping arm. The second hollow portion is disposed between the first clamping arm and the third clamping arm. The third clamping arm is off contact with the first clamping arm or the base.

In an example, the at least one second claw includes a sixth clamping arm and a fourth hollow portion. An end of the sixth clamping arm is connected to the second pressing portion. Another end of the sixth clamping arm extends towards the base. The fifth clamping arm and the sixth clamping arm are located on two opposite sides of the fourth clamping arm. The fourth hollow portion is disposed between the fourth clamping arm and the sixth clamping arm. The sixth clamping arm is off contact with the fourth clamping arm or the base.

In an example, the at least one second claw includes a plurality of second claws. Each of the plurality of second claws contacts with the airtight ring. The first claw and the plurality of second claws surround the airtight ring. Two of the plurality of second claws are connected to and located on two sides of the first claw. The sixth clamping arm of one of the two of the plurality of second claws connected to the first claw is connected to the second clamping arm. The fifth clamping arm of another of the two of the plurality of second claws connected to the first claw is connected to the third clamping arm.

In an example, the sliding groove includes an inner periphery having an annular protrusive portion and an annular recessed portion. A width of the annular protrusive portion perpendicular to the longitudinal axis is smaller than a width of the annular recessed portion perpendicular to the longitudinal axis. The annular recessed portion is contiguous to the annular protrusive portion and is located on a side of the annular protrusive portion adjacent to the rear end of the housing. Each of the first, second, and third clamping arms includes a first push portion disposed on an outer periphery thereof surrounding the longitudinal axis. A distance between the first push portion of each of the second clamping arm and the third clamping arm and the longitudinal axis is greater than a distance between the first push portion of the first clamping arm and the longitudinal axis. Each of the fourth, fifth, and sixth clamping arms includes a second push portion on an outer periphery thereof surrounding the longitudinal axis. A distance between the second push portion of each of the fifth clamping arm and the sixth clamping arm and the longitudinal axis is greater than a distance between the second push portion of the fourth clamping arm and the longitudinal axis. When the pressing device is in the first state, the first and second push portions are located between the annular protrusive portion and the front end of the housing. When the pressing device is in the second state, the annular protrusive portion presses against the first and second push portions, and the first and second push portions move into and are positioned in the annular recessed portion.

In an example, the inner periphery of the sliding groove has a shoulder. A width of a side of the shoulder adjacent to the rear end of the housing perpendicular to the longitudinal axis is smaller than a width of another side of the shoulder adjacent to the front end of the housing perpendicular to the longitudinal axis. An inner diameter of the shoulder perpendicular to the longitudinal axis gradually increases from the side adjacent to the front end of the housing towards the another side adjacent to the rear end of the housing to form a conic surface. The pressing device includes a pressing seat, a compressing spring, and a pressing member. The base is connected to an end of the pressing seat adjacent to the front end of the housing. The pressing seat includes a receptacle extending along the longitudinal axis from an end thereof adjacent to the front end of the housing towards another end thereof adjacent to the rear end of the housing. The pressing seat includes a receiving groove extending in a radial direction perpendicular to the longitudinal axis. The receiving groove is disposed on a side of the receptacle and intercommunicates with the receptacle. A pressing arm is disposed in the receiving groove. An end of the pressing aim has a holding portion on an end thereof. The holding portion is flexible relative to the pressing seat. When the pressing device is in the first state, the holding portion is located between the shoulder and the front end of the housing and is remote from longitudinal axis. When the pressing device is in the second state, the holding portion is located between the shoulder and the rear end of the housing and is close to the longitudinal axis. The compression spring and the pressing member are received in the receptacle. An end of the compression spring presses against an inner periphery of the receptacle. The pressing member is movable relative to the pressing seat along the longitudinal axis and is disposed around an end of the compression spring adjacent to the front end of the housing.

In an example, the housing further includes an end cap and a sleeve. The end cap is connected to an end of the sleeve. The front end of the housing is disposed on the end cap. The rear end of the housing is disposed on an end of the sleeve opposite to the end cap. The sliding groove extends through the end cap and the sleeve. The annular recessed portion is disposed on the end cap. The annular protrusive portion is disposed on an interconnection between the end cap and the sleeve. The shoulder is disposed on the sleeve.

In an example, the pressing device includes a rear cap connected to an end of the pressing seat opposite to the clamping member. The rear cap includes a wider portion and a narrower portion on an outer periphery thereof surrounding the longitudinal axis. A width of the narrower portion perpendicular to the longitudinal axis is smaller than a width of the wider portion perpendicular to the longitudinal axis. When the pressing device is in the first state, the narrower portion abuts against the rear end of the housing. When the pressing device is in the second state, the narrower portion disengages from an end face of the rear end of the housing. The wider portion remains in a position off contact with the sleeve.

In an example, the base is in threading connection with the pressing seat.

In an example, the base is integrally formed with the pressing seat.

The present invention will become clearer in light of the following detailed description of illustrative embodiments of this invention described in connection with the drawings.

DETAILED DESCRIPTION OF THE INVENTION

Figure 1:
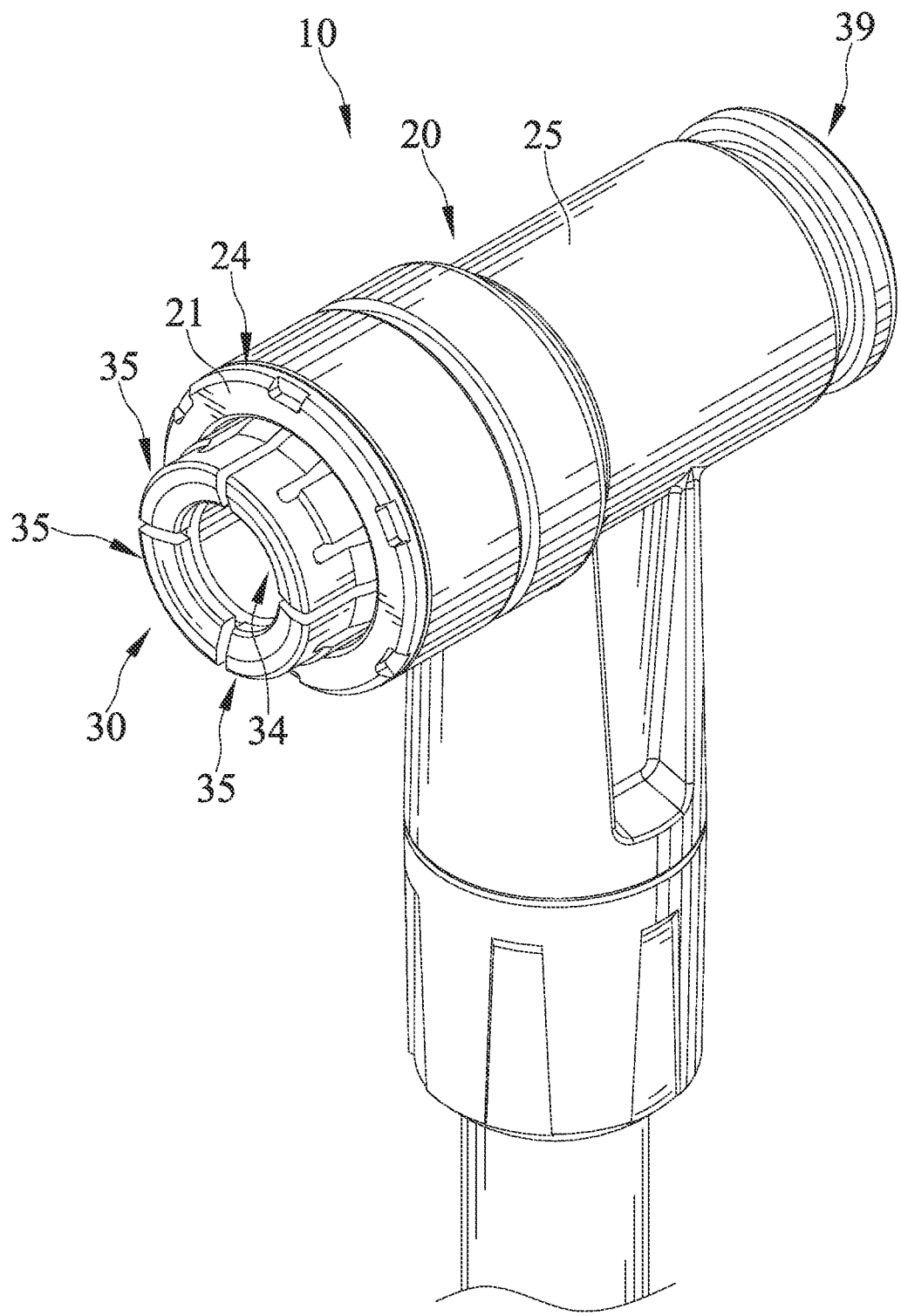
FIG. 1 is a perspective view of an inflation pump connector suitable for various valves of a first embodiment according to the present invention.
Figure 2:
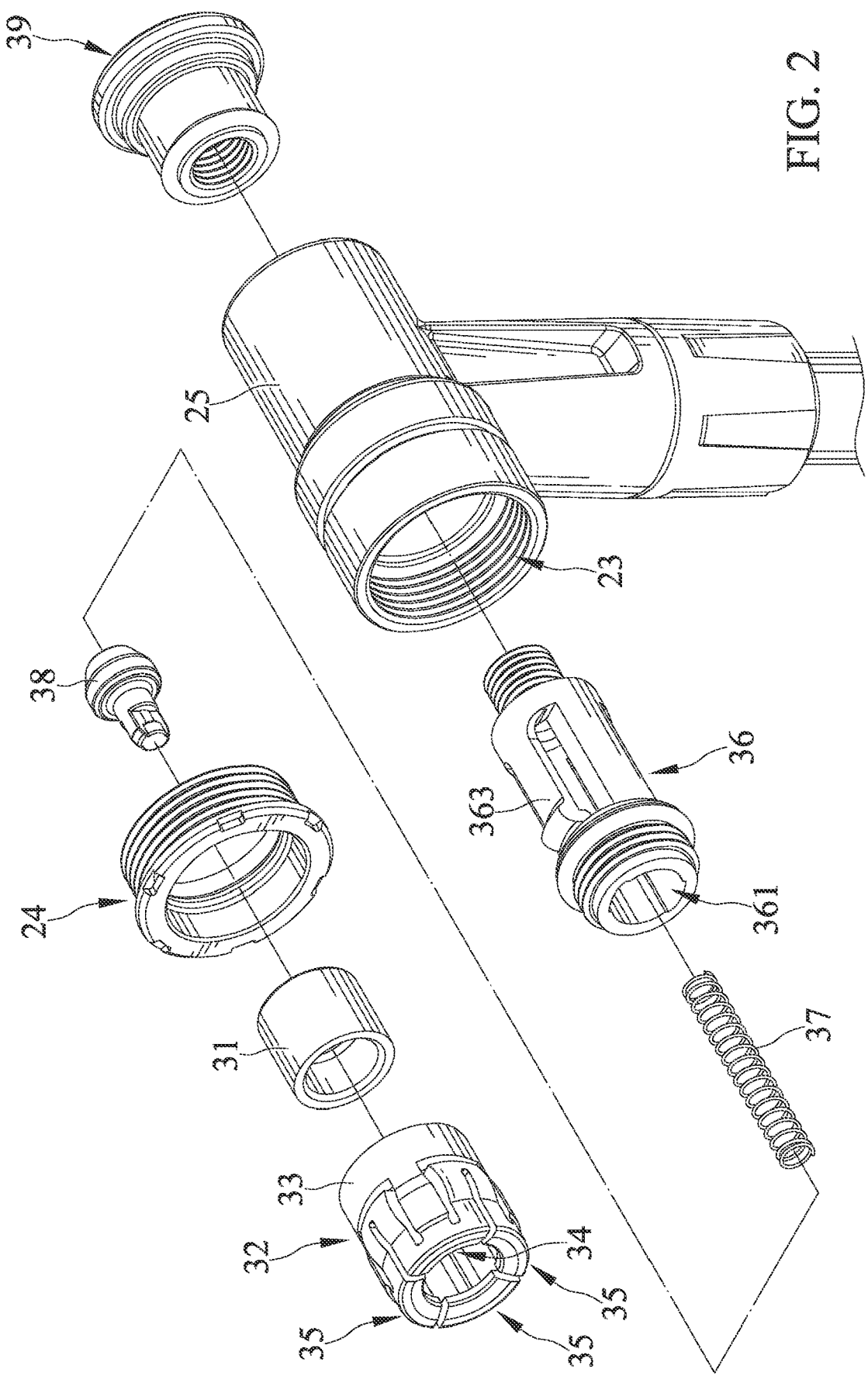
FIG. 2 is an exploded, perspective view of the inflation pump connector suitable for various valves of the first embodiment according to the present invention.
Figure 3:
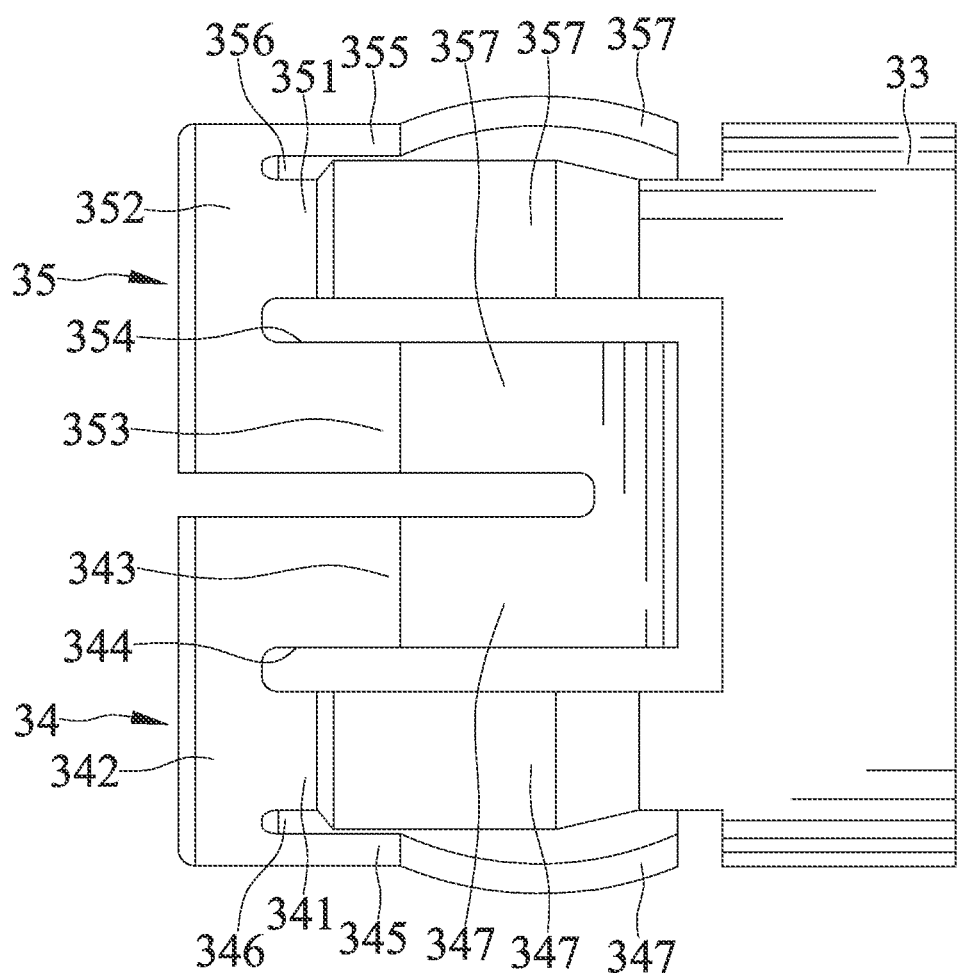
FIG. 3 is a plan view of a clamping member of the inflation pump connector suitable for various valves of the first embodiment according to the present invention.

The techniques, measures, and effects of present invention will hereinafter set forth in detail by two preferred embodiments described in connection with the drawings. The description is provided for the purpose of explanation only, and the application for patent shall not be restricted by such structures.

FIGS. 1-7 illustrate a perspective view, an exploded-perspective view, and cross sectional views of an inflation pump connector 10 suitable for various valves of a first embodiment according to the present invention and a plan view of a clamping member of the inflation pump connector 10. The inflation pump connector 10 comprises a housing 20 and a pressing device 30.

The housing 20 includes a front end 21 and a rear end 22 spaced from the front end 21 along a longitudinal axis L. The housing 20 includes a sliding groove 23 extending along the longitudinal axis L. The sliding groove 23 extends from the front end 21 towards the rear end 22.

The pressing device 30 is slidably received in the sliding groove 23 and is switchable between a first state (first position) and a second state (second position). The pressing device 30 includes an airtight ring 31 and a clamping member 32. The clamping member 32 includes a base 33 and a first claw 34 contacting with the airtight ring 31. The first claw 34 includes a first clamping arm 341, a first pressing portion 342, a second clamping arm 343, and a first hollow portion 344. An end of the first clamping arm 341 is connected to the base 33. The first pressing portion 342 is connected to another end of the first clamping arm 341 opposite to the base 33. An end of the second clamping arm 343 is connected to the first pressing portion 342. Another end of the second clamping arm 343 extends towards the base 33. The first hollow portion 344 is disposed between the first clamping arm 341 and the second clamping arm 343. The second clamping arm 343 is off contact with the first clamping arm 341 or the base 33. The pressing device 30 is movable away from the rear end 22 of the housing 20 to move the first pressing portion 342 away from the longitudinal axis L, switching the pressing device 30 to the first state (see FIG. 4). The pressing device 30 is movable towards the rear end 22 of the housing 20 to actuate the first pressing portion 342 to move towards the longitudinal axis L and to squeeze and deform the airtight ring 31, switching the pressing device 30 to the second state (see FIG. 6).

The first claw 34 includes a third clamping arm 345 and a second hollow portion 346. An end of the third clamping arm 345 is connected to the first pressing portion 342. Another end of the third clamping arm 345 extends towards the base 33. The second and third clamping arms 343 and 345 are located on two opposite sides of the first clamping arm 341. The second hollow portion 346 is disposed between the first clamping arm 341 and the third clamping arm 345. The third clamping arm 345 is off contact with the first clamping aim 341 or the base 33.

The clamping member 32 includes at least one second claw 35 contacting with the airtight ring 31. The at least one second claw 35 includes a fourth clamping arm 351, a second pressing portion 352, a fifth clamping arm 353, and a third hollow portion 354. An end of the fourth clamping arm 351 is connected to the base 33. The second pressing portion 352 is connected to another end of the fourth clamping arm 351 opposite to the base 33. An end the fifth clamping arm 353 is connected to the second pressing portion 352. Another end of the fifth clamping arm 353 extends towards the base 33. The third hollow portion 354 is disposed between the fourth clamping arm 351 and the fifth clamping arm 353. The fifth clamping arm 353 is off contact with the fourth clamping arm 351 or the base 33. When the pressing device 30 moves away from the rear end 22 of the housing 20 to the first state, the first pressing portion 342 and the second pressing portion 352 move away from the longitudinal axis L. When the pressing device 30 moves towards the rear end 22 of the housing 20 to the second state, the first pressing portion 342 and the second pressing portion 352 move towards the longitudinal axis L and to squeeze and deform the airtight ring 31. The at least one second claw 35 includes a sixth clamping arm 355 and a fourth hollow portion 356. An end of the sixth clamping arm 355 is connected to the second pressing portion 352. Another end of the sixth clamping arm 355 extends towards the base 33. The fifth clamping arm 353 and the sixth clamping arm 355 are located on two opposite sides of the fourth clamping arm 351. The fourth hollow portion 356 is disposed between the fourth clamping arm 351 and the sixth clamping arm 355. The sixth clamping arm 355 is off contact with the fourth clamping arm 351 or the base 33.

In this embodiment, the clamping member 32 includes a plurality of second claws 35. Each of the plurality of second claws 35 contacts with the airtight ring 31. The first claw 34 and the plurality of second claws 35 surround the airtight ring 31. Two of the plurality of second claws 35 are connected to and located on two sides of the first claw 34. The sixth clamping arm 355 of one of the two of the plurality of second claws 35 connected to the first claw 34 is connected to the second clamping arm 343. The fifth clamping arm 353 of another of the two of the plurality of second claws 35 connected to the first claw 34 is connected to the third clamping arm 345.

The sliding groove 23 includes an inner periphery having an annular protrusive portion 231 and an annular recessed portion 232. A width of the annular protrusive portion 231 perpendicular to the longitudinal axis L is smaller than a width of the annular recessed portion 232 perpendicular to the longitudinal axis L. The annular recessed portion 232 is contiguous to the annular protrusive portion 231 and is located on a side of the annular protrusive portion 231 adjacent to the rear end 22 of the housing 20. Each of the first, second, and third clamping arms 341, 343, and 345 includes a first push portion 347 disposed on an outer periphery thereof surrounding the longitudinal axis L. A distance between the first push portion 347 of each of the second clamping arm 343 and the third clamping arm 345 and the longitudinal axis L is greater than a distance between the first push portion 347 of the first clamping arm 341 and the longitudinal axis L. Each of the fourth, fifth, and sixth clamping arms 351, 353, 355 includes a second push portion 357 on an outer periphery thereof surrounding the longitudinal axis L. A distance between the second push portion 357 of each of the fifth clamping arm 353 and the sixth clamping arm 355 and the longitudinal axis L is greater than a distance between the second push portion 357 of the fourth clamping arm 351 and the longitudinal axis L. When the pressing device 30 is in the first state, the first and second push portions 347, 357 are located between the annular protrusive portion 231 and the front end 21 of the housing 20. When the pressing device 30 is in the second state, the annular protrusive portion 231 presses against the first and second push portions 347 and 357, and the first and second push portions 347 and 357 move into and are positioned in the annular recessed portion 232.

The inner periphery of the sliding groove 23 has a shoulder 233. A width of a side of the shoulder 233 adjacent to the rear end 22 of the housing 20 perpendicular to the longitudinal axis L is smaller than a width of another side of the shoulder 233 adjacent to the front end 21 of the housing 20 perpendicular to the longitudinal axis L. An inner diameter of the shoulder 233 perpendicular to the longitudinal axis L gradually increases from the side adjacent to the front end 21 towards the another side adjacent to the rear end 22 to form a conic surface. The pressing device 30 includes a pressing seat 36, a compressing spring 37, and a pressing member 38. The base 33 is connected to an end of the pressing seat 36 adjacent to the front end 21 of the housing 20. The pressing seat 36 includes a receptacle 361 extending along the longitudinal axis L from an end thereof adjacent to the front end 21 of the housing 20 towards another end thereof adjacent to the rear end 22 of the housing 20. The pressing seat 36 includes a receiving groove 362 extending in a radial direction perpendicular to the longitudinal axis L. The receiving groove 362 is disposed on a side of the receptacle 361 and intercommunicates with the receptacle 361. A pressing arm 363 is disposed in the receiving groove 362. An end of the pressing arm 363 has a holding portion 364 on an end thereof. The holding portion 364 is flexible relative to the pressing seat 36. When the pressing device 30 is in the first state, the holding portion 364 is located between the shoulder 233 and the front end 21 of the housing 20 and is remote from longitudinal axis L (see FIG. 4). When the pressing device 30 is in the second state, the holding portion 364 is located between the shoulder 233 and the rear end 22 of the housing 20 and is close to the longitudinal axis L (see FIG. 6). The compression spring 37 and the pressing member 38 are received in the receptacle 361. An end of the compression spring 37 presses against an inner periphery of the receptacle 361. The pressing member 38 is movable relative to the pressing seat 36 along the longitudinal axis L and is disposed around an end of the compression spring 37 adjacent to the front end 21 of the housing 20.

The housing 20 further includes an end cap 24 and a sleeve 25. The end cap 24 is connected to an end of the sleeve 25. The front end 21 of the housing 20 is disposed on the end cap 24. The rear end 22 of the housing 20 is disposed on an end of the sleeve 25 opposite to the end cap 24. The sliding groove 23 extends through the end cap 24 and the sleeve 25. The annular recessed portion 232 is disposed on the end cap 24. The annular protrusive portion 231 is disposed on an interconnection between the end cap 24 and the sleeve 25. The shoulder 233 is disposed on the sleeve 25.

The pressing device 30 includes a rear cap 39 connected to an end of the pressing seat 36 opposite to the clamping member 32. The rear cap 39 includes a wider portion 391 and a narrower portion 392 on an outer periphery thereof surrounding the longitudinal axis L. A width of the narrower portion 392 perpendicular to the longitudinal axis L is smaller than a width of the wider portion 391 perpendicular to the longitudinal axis L. When the pressing device 30 is in the first state, the narrower portion 392 abuts against the rear end 22 of the housing 20. When the pressing device 30 is in the second state, the narrower portion 392 disengages from an end face of the rear end 22 of the housing 20. The wider portion 391 remains in a position off contact with the sleeve 25.

Figure 4:
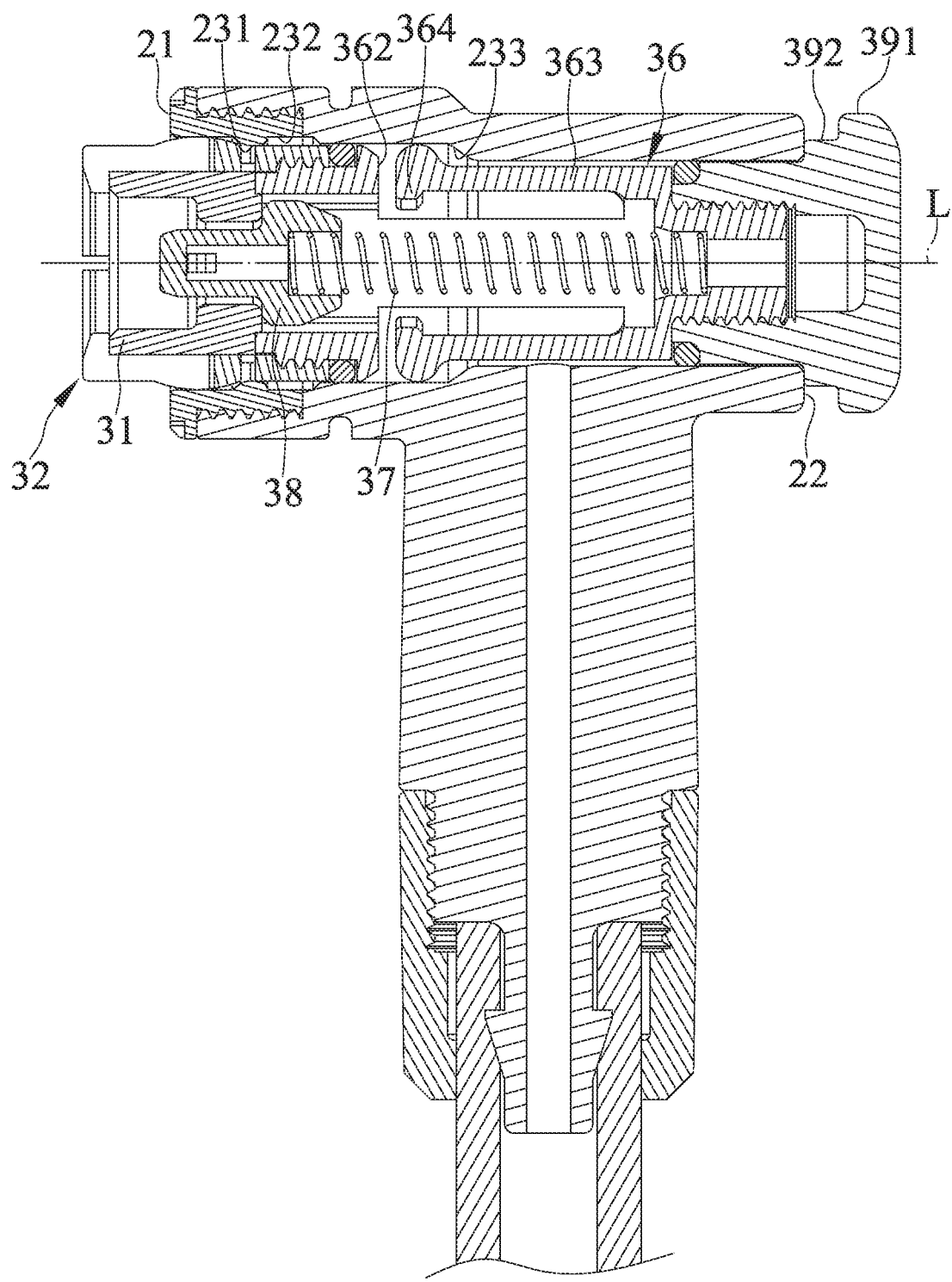
FIG. 4 is a cross sectional view of the inflation pump connector suitable for various valves of the first embodiment according to the present invention.
Figure 5:
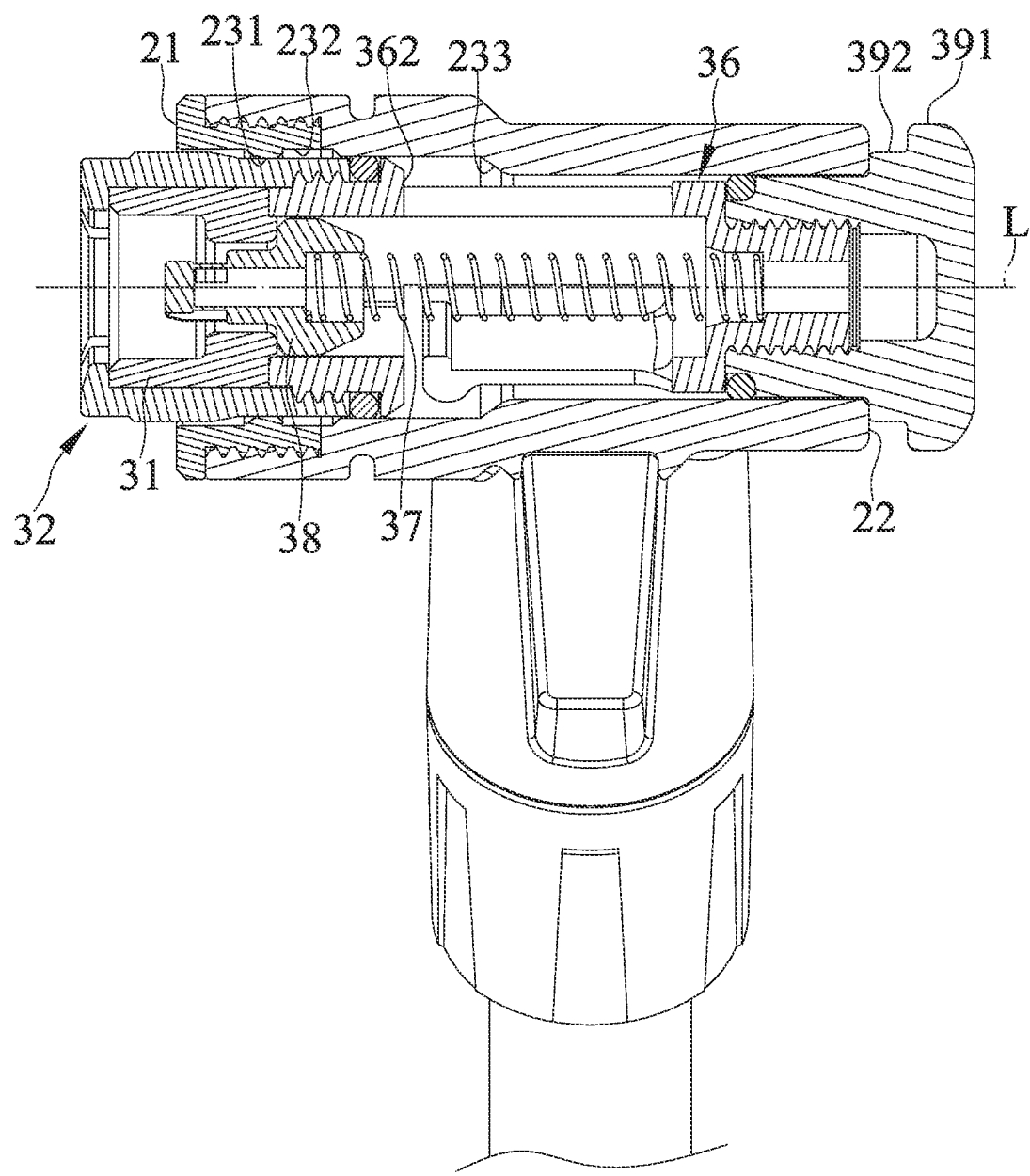
FIG. 5 is a cross sectional view of the inflation pump connector suitable for various valves of the first embodiment according to the present invention from a different visual angle.

The base 33 is in threading connection with the pressing seat 36. The pressing device 30 is initially in the first state (the first position), as shown in FIGS. 4 and 5.

Figure 6:
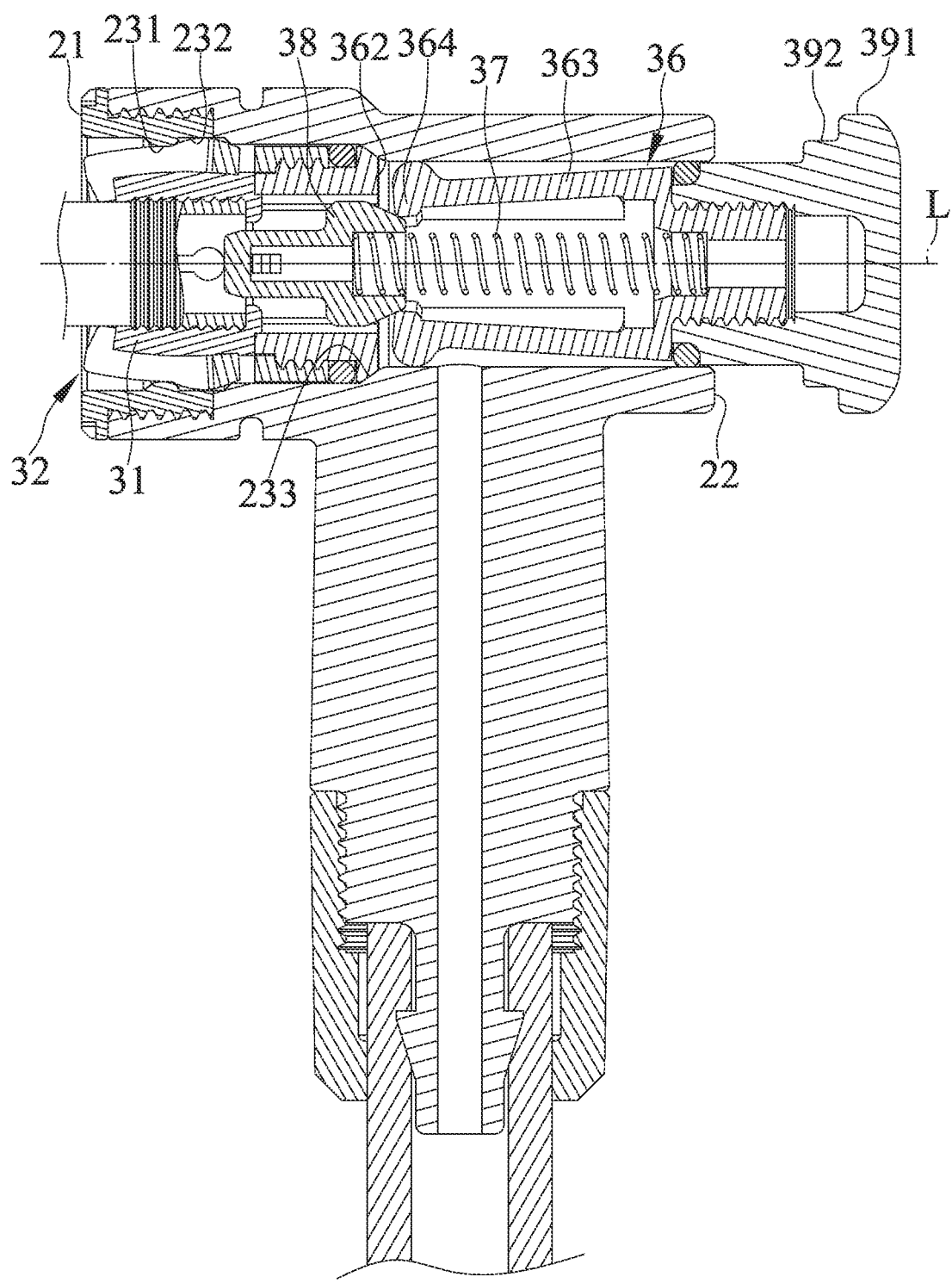
FIG. 6 is a cross sectional view illustrating coupling of the inflation pump connector suitable for various valves of the first embodiment according to the present invention with an American valve.

When the inflation pump connector 10 is coupled with an American valve, the American valve is inserted into the pressing device 30 and comes in contact with the pressing member 38. The American valve is further inserted into the housing 20, pushing the pressing device 30 to move relative to the housing 20 along the longitudinal axis L to the second position (the second state), as shown in FIG. 6. The pressing arm 363 avoids backward movement of the pressing member 38. The pressing member 38 pushes open a check valve of the American valve. The first claw 34 and the plurality of second claws 35 squeeze and deform the airtight ring 31 and tightly clamp the American valve, achieving an airtight effect. By the above structure, operation of the inflation pump connector 10 is rapid and very convenient to use.

Figure 7:
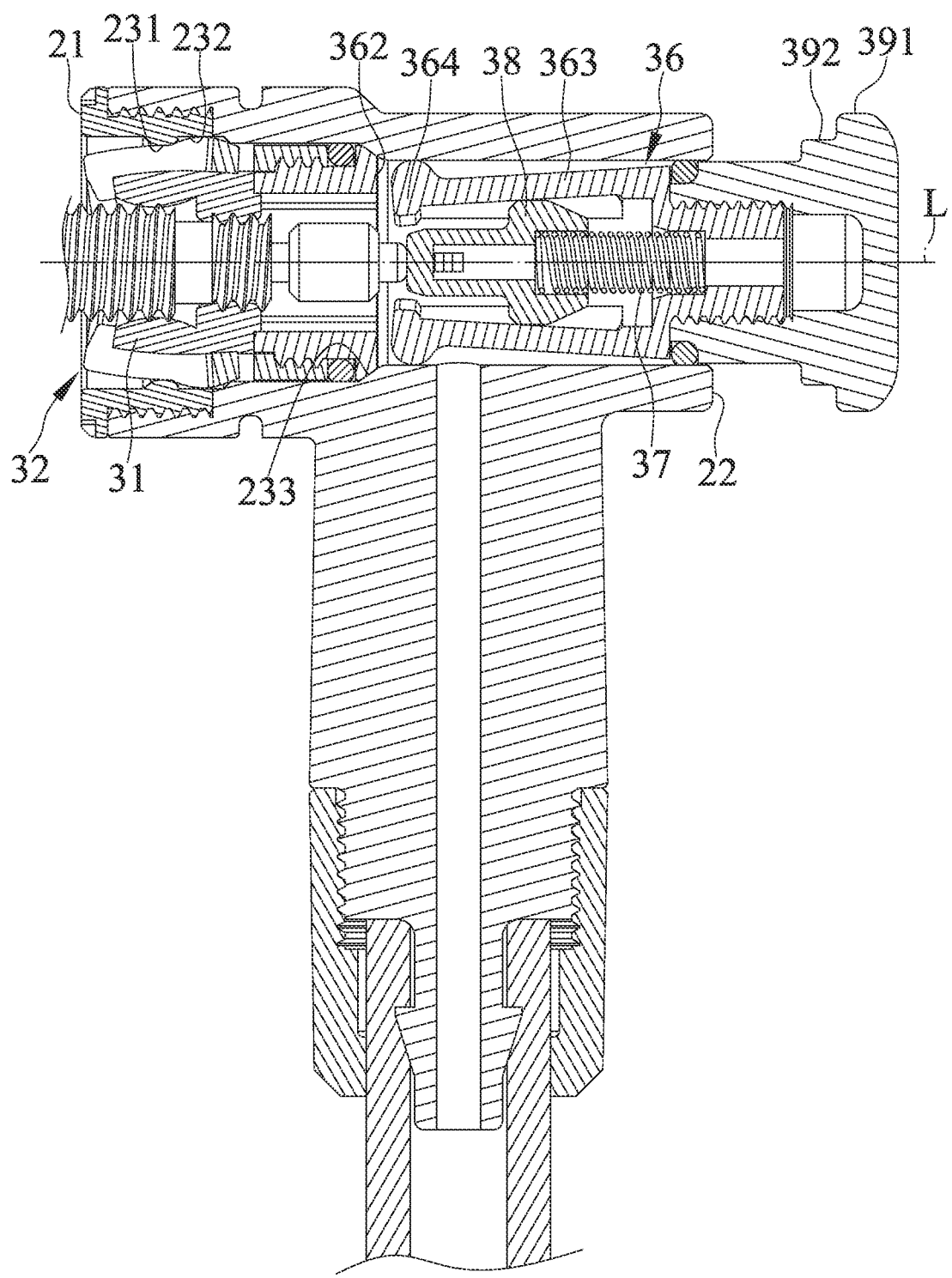
FIG. 7 is a cross sectional view illustrating coupling of the inflation pump connector suitable for various valves of the first embodiment according to the present invention with a French valve.

Likewise, when the inflation pump connector 10 is coupled with a French valve, the French valve is inserted into the pressing device 30 to push the pressing member 38 and to compress the compression spring 37. The French valve is further inserted into the housing 20, pushing the pressing device 30 to move relative to the housing 20 along the longitudinal axis L to the second position (the second state), as shown in FIG. 7. The first claw 34 and the plurality of second claws 35 squeeze and deform the airtight ring 31 and tightly clamp the French valve, achieving an airtight effect. Since the diameter of the French valve is smaller than the diameter of the American valve and since the insertion depth of the French valve into the inflation pump connector 10 is greater than the insertion depth of the American valve into the inflation pump connector 10, the deformation extents of the first claw 34 and the plurality of second claws 35 need to be greater to enable the airtight ring 31 to generate the desired airtight effect. By the arrangement of the second, third, fifth, and sixth clamping arms 343, 345, 353, and 355 off contact with the base 33, the second, third, fifth, and sixth clamping arms 343, 345, 353, and 355 can have larger deformation extents to increase the airtight effect of the airtight ring 31.

Figure 8:
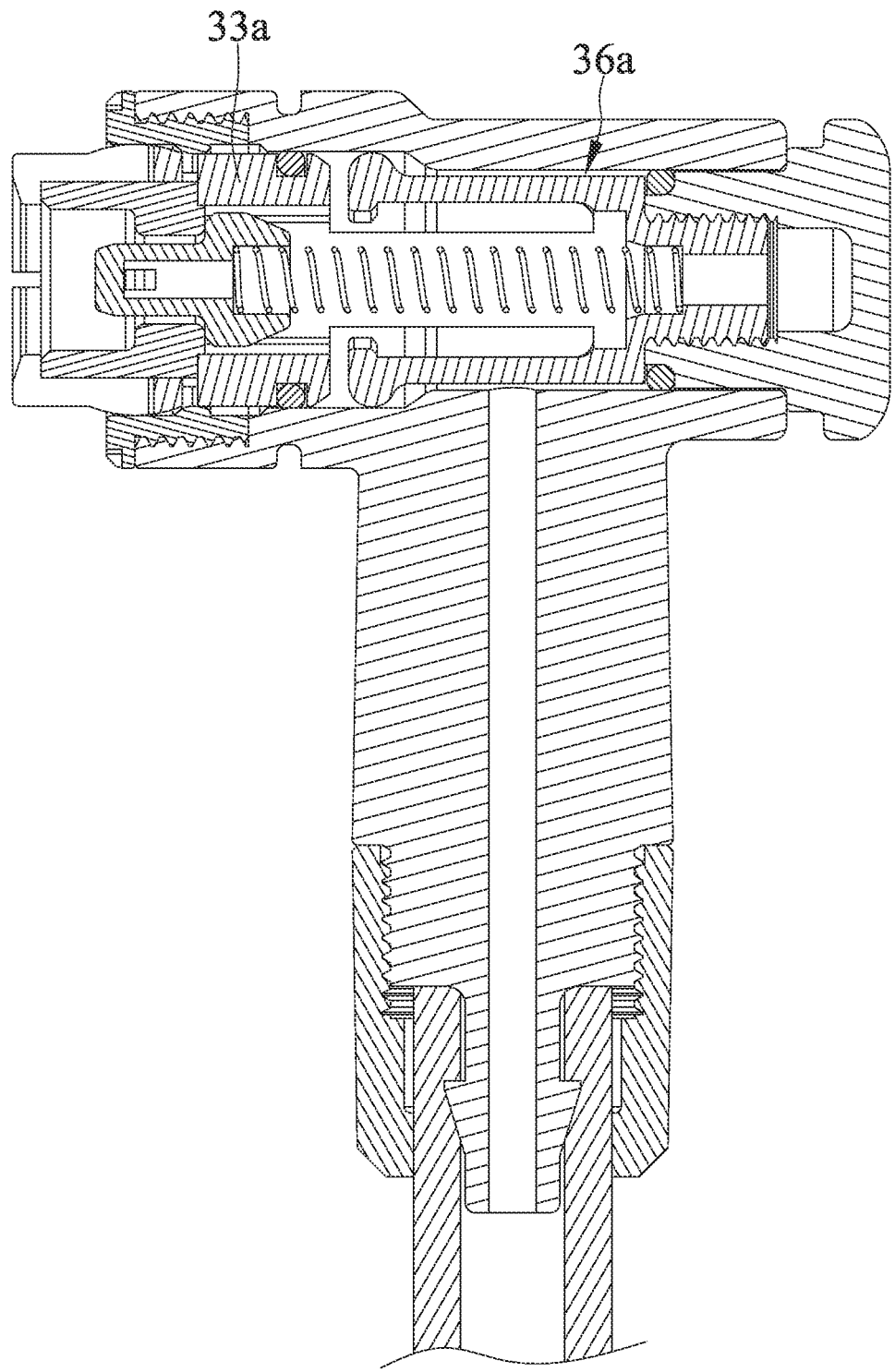
FIG. 8 is a cross sectional view of an inflation pump connector suitable for various valves of a second embodiment according to the present invention.

FIG. 8 shows a cross sectional view of an inflation pump connector suitable for various valves of a second embodiment according to the present invention. The second embodiment is substantially the same as the first embodiment. The main difference is that the base 33a is integrally formed with the pressing seat 36a.

In view of the foregoing, the inflation pump connector 10 can be used for an American valve and a French valve while achieving a reliable airtight ring 31 via rapid, convenient operation.

Although specific embodiments have been illustrated and described, numerous modifications and variations are still possible without departing from the scope of the invention. The scope of the invention is limited by the accompanying claims.

The invention claimed is:

1. An inflation pump connector suitable for various valves, the inflation pump connector comprising:
a housing including a front end and a rear end spaced from the front end along a longitudinal axis, wherein the housing includes a sliding groove extending along the longitudinal axis, and wherein the sliding groove extends from the front end towards the rear end; and
a pressing device slidably received in the sliding groove and switchable between a first state and a second state, wherein the pressing device includes an airtight ring and a clamping member, wherein the clamping member includes a base and a first claw contacting with the airtight ring, wherein the first claw includes a first clamping arm, a first pressing portion, a second clamping arm, and a first hollow portion,
wherein an end of the first clamping arm is connected to the base, wherein the first pressing portion is connected to another end of the first clamping arm opposite to the base,
wherein an end of the second clamping arm is connected to the first pressing portion, wherein another end of the second clamping arm extends towards the base, wherein the first hollow portion is disposed between the first clamping arm and the second clamping arm, wherein the second clamping arm is off contact with the first clamping arm or the base,
wherein the clamping member includes at least one second claw contacting with the airtight ring, wherein the at least one second claw includes a fourth clamping arm, a second pressing portion, a fifth clamping arm, and a third hollow portion, wherein an end of the fourth clamping arm is connected to the base, wherein the second pressing portion is connected to another end of the fourth clamping arm opposite to the base, wherein an end the fifth clamping arm is connected to the second pressing portion, wherein another end of the fifth clamping arm extends towards the base, wherein the third hollow portion is disposed between the fourth clamping arm and the fifth clamping arm, wherein the fifth clamping arm is off contact with the fourth clamping arm or the base,
wherein the pressing device is movable away from the rear end of the housing to move the first pressing portion and the second pressing portion away from the longitudinal axis, switching the pressing device to the first state, and
wherein the pressing device is movable towards the rear end of the housing to actuate the first pressing portion and the second pressing portion to move towards the longitudinal axis and to squeeze and deform the airtight ring, switching the pressing device to the second state.

2. The inflation pump connector suitable for various valves as claimed in claim 1, wherein the first claw includes a third clamping arm and a second hollow portion, wherein an end of the third clamping arm is connected to the first pressing portion, wherein another end of the third clamping arm extends towards the base, wherein the second and third clamping arms are located on two opposite sides of the first clamping arm, wherein the second hollow portion is disposed between the first clamping arm and the third clamping arm, and wherein the third clamping arm is off contact with the first clamping arm or the base.

3. The inflation pump connector suitable for various valves as claimed in claim 2, wherein the at least one second claw includes a sixth clamping arm and a fourth hollow portion, wherein an end of the sixth clamping arm is connected to the second pressing portion, wherein another end of the sixth clamping arm extends towards the base, wherein the fifth clamping arm and the sixth clamping aim are located on two opposite sides of the fourth clamping arm, wherein the fourth hollow portion is disposed between the fourth clamping arm and the sixth clamping arm, and wherein the sixth clamping arm is off contact with the fourth clamping arm or the base.

4. The inflation pump connector suitable for various valves as claimed in claim 3, wherein the at least one second claw includes a plurality of second claws, wherein each of the plurality of second claws contacts with the airtight ring, wherein the first claw and the plurality of second claws surround the airtight ring, wherein two of the plurality of second claws are connected to and located on two sides of the first claw, wherein the sixth clamping arm of one of the two of the plurality of second claws connected to the first claw is connected to the second clamping arm, and wherein the fifth clamping arm of another of the two of the plurality of second claws connected to the first claw is connected to the third clamping arm.

5. The inflation pump connector suitable for various valves as claimed in claim 4, wherein the sliding groove includes an inner periphery having an annular protrusive portion and an annular recessed portion, wherein a width of the annular protrusive portion perpendicular to the longitudinal axis is smaller than a width of the annular recessed portion perpendicular to the longitudinal axis, wherein the annular recessed portion is contiguous to the annular protrusive portion and is located on a side of the annular protrusive portion adjacent to the rear end of the housing, wherein each of the first, second, and third clamping arms includes a first push portion disposed on an outer periphery thereof surrounding the longitudinal axis, wherein a distance between the first push portion of each of the second clamping arm and the third clamping arm and the longitudinal axis is greater than a distance between the first push portion of the first clamping arm and the longitudinal axis, wherein each of the fourth, fifth, and sixth clamping arms includes a second push portion on an outer periphery thereof surrounding the longitudinal axis, wherein a distance between the second push portion of each of the fifth clamping arm and the sixth clamping arm and the longitudinal axis is greater than a distance between the second push portion of the fourth clamping arm and the longitudinal axis, wherein when the pressing device is in the first state, the first and second push portions are located between the annular protrusive portion and the front end of the housing, and wherein when the pressing device is in the second state, the annular protrusive portion presses against the first and second push portions, and the first and second push portions move into and are positioned in the annular recessed portion.

6. The inflation pump connector suitable for various valves as claimed in claim 5, wherein the inner periphery of the sliding groove has a shoulder, wherein a width of a side of the shoulder adjacent to the rear end of the housing perpendicular to the longitudinal axis is smaller than a width of another side of the shoulder adjacent to the front end of the housing perpendicular to the longitudinal axis, wherein an inner diameter of the shoulder perpendicular to the longitudinal axis gradually increases from the side adjacent to the front end of the housing towards the another side adjacent to the rear end of the housing to form a conic surface, wherein the pressing device includes a pressing seat, a compressing spring, and a pressing member, wherein the base is connected to an end of the pressing seat adjacent to the front end of the housing, wherein the pressing seat includes a receptacle extending along the longitudinal axis from an end thereof adjacent to the front end of the housing towards another end thereof adjacent to the rear end of the housing, wherein the pressing seat includes a receiving groove extending in a radial direction perpendicular to the longitudinal axis, wherein the receiving groove is disposed on a side of the receptacle and intercommunicates with the receptacle, wherein a pressing arm is disposed in the receiving groove, wherein an end of the pressing arm has a holding portion on an end thereof, wherein the holding portion is flexible relative to the pressing seat, wherein when the pressing portion is in the first state, the holding portion is located between the shoulder and the front end of the housing and is remote from longitudinal axis, wherein when the pressing portion is in the second state, the holding portion is located between the shoulder and the rear end of the housing and is close to the longitudinal axis, wherein the compression spring and the pressing member are received in the receptacle, wherein an end of the compression spring presses against an inner periphery of the receptacle, and wherein the pressing member is movable relative to the pressing seat along the longitudinal axis and is disposed around an end of the compression spring adjacent to the front end of the housing.

7. The inflation pump connector suitable for various valves as claimed in claim 1, wherein the housing further includes an end cap and a sleeve, wherein the end cap is connected to an end of the sleeve, wherein the front end of the housing is disposed on the end cap, wherein the rear end of the housing is disposed on an end of the sleeve opposite to the end cap, wherein the sliding groove extends through the end cap and the sleeve, wherein the annular recessed portion is disposed on the end cap, wherein the annular protrusive portion is disposed on an interconnection between the end cap and the sleeve, and wherein the shoulder is disposed on the sleeve.

8. The inflation pump connector suitable for various valves as claimed in claim 1, wherein the pressing device includes a rear cap connected to an end of the pressing seat opposite to the clamping member, wherein the rear cap includes a wider portion and a narrower portion on an outer periphery thereof surrounding the longitudinal axis, wherein a width of the narrower portion perpendicular to the longitudinal axis is smaller than a width of the wider portion perpendicular to the longitudinal axis, wherein when the pressing device is in the first state, the narrower portion abuts against the rear end of the housing, and wherein when the pressing device is in the second state, the narrower portion disengages from an end face of the rear end of the housing, and wherein the wider portion remains in a position off contact with the sleeve.

9. The inflation pump connector suitable for various valves as claimed in claim 1, wherein the base is in threading connection with the pressing seat.

10. The inflation pump connector suitable for various valves as claimed in claim 1, wherein the base is integrally formed with the pressing seat.

* * * * *